(12) United States Patent
Rochford et al.

(10) Patent No.: US 8,275,663 B2
(45) Date of Patent: Sep. 25, 2012

(54) METHOD AND SYSTEM FOR IMPROVING PERSONALIZATION OF ADVERTISING FOR MOBILE DEVICES USING PEER RATING

(75) Inventors: Ciaran Rochford, Mountain View, CA (US); Zhinan Zhou, Sammamish, WA (US); Madan Ankapura, Milpitas, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 12/387,096

(22) Filed: Apr. 27, 2009

(65) Prior Publication Data

US 2010/0274624 A1    Oct. 28, 2010

(51) Int. Cl.
   *G06F 17/00* (2006.01)
   *G06Q 30/00* (2012.01)

(52) U.S. Cl. .............. 705/14.67; 705/7.29; 705/14.42; 705/14.64; 705/14.66

(58) Field of Classification Search ............ 705/14, 705/7.29, 14.26, 14.64, 10, 14.42, 14.66; 707/3; 455/414.1
   See application file for complete search history.

(56) References Cited

U.S. PATENT DOCUMENTS

| | | | | |
|---|---|---|---|---|
| 7,606,562 B2 * | 10/2009 | Aaltonen et al. | ........... | 455/414.1 |
| 7,853,475 B2 * | 12/2010 | Deaton et al. | ................ | 705/7.29 |
| 7,930,208 B2 * | 4/2011 | Sharman et al. | ........... | 705/14.26 |
| 2005/0080665 A1 * | 4/2005 | Bowman-Amuah | ............ | 705/14 |
| 2006/0149630 A1 * | 7/2006 | Elliott et al. | ................. | 705/14 |
| 2007/0067267 A1 * | 3/2007 | Ives | .................................. | 707/3 |
| 2008/0172291 A1 | 7/2008 | Hurowitz et al. | | |
| 2009/0027223 A1 | 1/2009 | Hill | | |
| 2010/0223138 A1 * | 9/2010 | Dragt | ......................... | 705/14.64 |

FOREIGN PATENT DOCUMENTS

EP    1 995 933 A1    11/2008

OTHER PUBLICATIONS

European Search Report dated May 3, 2010 in connection with European Patent Application No. EP 09 17 9420.

* cited by examiner

*Primary Examiner* — John Weiss
*Assistant Examiner* — Marilyn G Macasiano

(57) ABSTRACT

For use in a wireless communication network, a method and system for targeting advertising for a mobile device is provided. The method includes receiving a plurality of advertisements from an advertising distributor. The method also includes filtering the advertisements based on meta data for each advertisement. The method further includes receiving ratings of the advertisements from a plurality of mobile devices. The method also includes further filtering the advertisements based on an end user profile and the ratings from the plurality of mobile devices. The method still further includes transmitting a selected advertisement to the first mobile device.

20 Claims, 6 Drawing Sheets

METHOD AND SYSTEM FOR IMPROVING PERSONALIZATION OF ADVERTISING FOR MOBILE DEVICES USING PEER RATING

TECHNICAL FIELD OF THE INVENTION

The present application relates generally to wireless communication and, more specifically, to a method and system for improving personalization of advertising for mobile devices using peer ratings.

BACKGROUND OF THE INVENTION

Marketing research results show that personalized advertisements (ads) improve the mobile advertising experience and stimulate consumers to purchase the advertised products. Mobile advertising refers to any paid form of non-personal presentation and promotion of ideas, products, or services by an identified sponsor using the mobile channel as a medium to deliver the advertisement messages. Example presentations of mobile advertising include WAP banner ads, mobile search advertising, mobile video bumpers, and interstitial ads on device portals. Advertising companies place a high value on information about consumers because the information allows them to target their advertising correctly, thereby increasing the relevance of the ads to consumers.

There are two major kinds of measurements for mobile advertising, CPM and CPC. CPM (cost per thousand) describes advertising where the displayed content is measured in terms of measured impressions. CPC (cost per click) describes advertising where the user responses are measured in terms of clicks, calls or other user actions associated with the displayed content irrespective of the number of impressions. In the case of WAP-based advertising, given a particular site, a prediction is made of the demographics of the user visiting that kind of site. Based on the demographics, the best suited content is displayed as an advertisement. These methods of displays produce very low user responses and low ROI for the infrastructure providers (since the advertiser pays only for the user actions), since different users may have very specific and varied interests, even though they belong to the same demographic.

Most of the prior art suffers from a lack of user specific information for targeting users for a specific advertisement. Additionally, the prior art lacks a method to rank the ad on a per user level and by the user's peers. Since there is no feedback from the user, there is no selection of ads at the ad server based on feedback from other users.

SUMMARY OF THE INVENTION

An ad server configured to transmit advertising content to a first mobile device is provided. The ad server includes a filter module configured to filter a plurality of advertisements based on meta data for each advertisement. The ad server also includes an ad decision module configured to further filter the plurality of advertisements based on an end user profile and end user ratings from a plurality of mobile devices. The ad server further includes an electronic storage medium for storing information about the plurality of advertisements.

A wireless communication network comprising a plurality of ad servers is provided. Each ad server is configured to transmit advertising content to a first mobile device. Each ad server includes a filter module configured to filter a plurality of advertisements based on meta data for each advertisement. Each ad server also includes an ad decision module configured to further filter the plurality of advertisements based on an end user profile and end user ratings from a plurality of mobile devices. Each ad server further includes an electronic storage medium for storing information about the plurality of advertisements.

A method of targeting advertising for a first mobile device is provided. The method includes receiving a plurality of advertisements from an advertising distributor. The method also includes filtering the advertisements based on meta data for each advertisement. The method further includes receiving end user ratings of the advertisements from a plurality of mobile devices. The method also includes further filtering the advertisements based on an end user profile and the end user ratings from the plurality of mobile devices. The method still further includes transmitting a selected advertisement to the first mobile device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

A main purpose of the method and system described herein is to drive up a mobile viewer's response to an ad by showing interest information about the ad from his peers. The disclosed method and system are also provided to influence the ad selection algorithm on an ad server by the use of social ranking algorithms.

Figure 1:
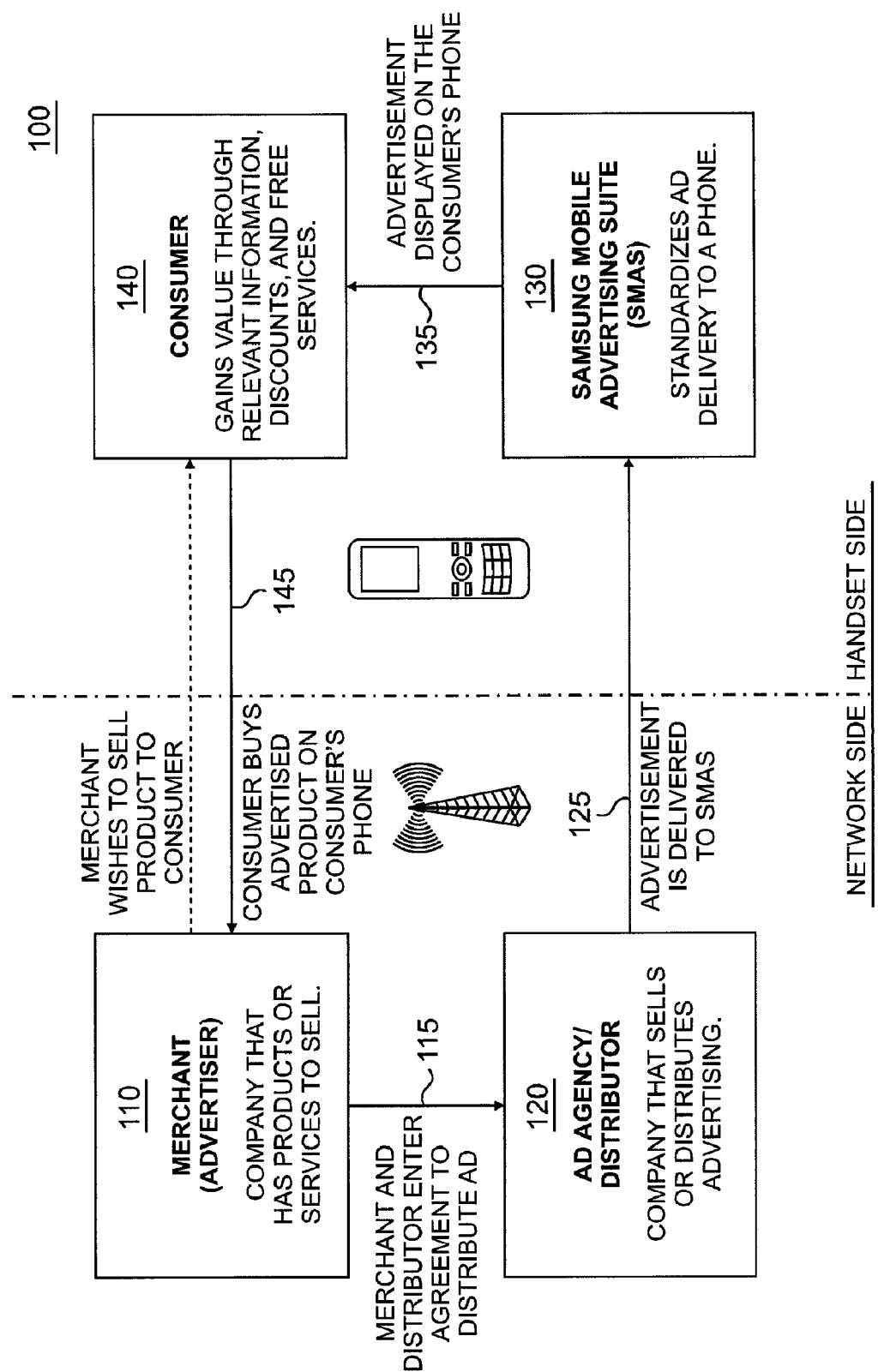
FIG. 1 illustrates a mobile advertising ecosystem utilizing a mobile advertising suite according to one embodiment of the present disclosure.
Figure 2:
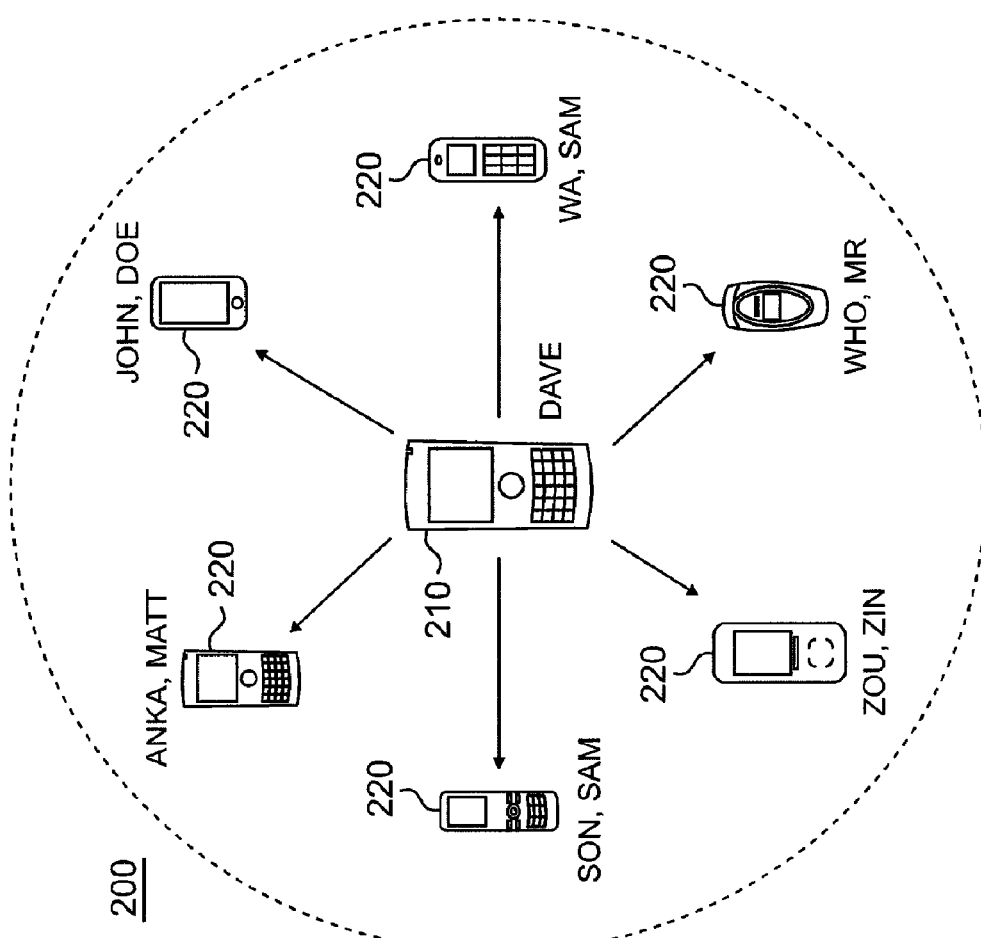
FIG. 2A illustrates a social contacts network in a wireless communication network according to one embodiment of the present disclosure.
FIG. 2B shows an exemplary display of a contact list on a user's mobile device, according to one embodiment of the present disclosure.

FIG. 1 illustrates a mobile advertising ecosystem utilizing a mobile advertising suite according to one embodiment of the present disclosure. Mobile advertising ecosystem 100 includes a merchant or company 110 that offers products or services for sale. The merchant or company 110 may also be referred to as an advertiser because the merchant uses advertising as a means of attracting customers for its products or services.

In order to attract customers, each merchant 110 enters into an advertising distribution agreement with an advertising agency or distributor 120, as seen in step 115. The advertising distributor 120 represents any company that creates, sells, and/or distributes advertising. In some embodiments, the advertising distributor 120 may be an entity completely separate from the merchant 110. In other embodiments, the advertising distributor 120 may be a division, subsidiary, joint venture, or sister company of, or otherwise related to, the merchant 110.

As part of the advertising distribution agreement, at least one advertisement is delivered from the advertising distributor 120 to a mobile advertising suite 130, as shown in step 125. One example of a mobile advertising suite 130 is the Samsung Mobile Advertising Suite (SMAS). The mobile advertising suite 130 standardizes the advertisement and prepares it for delivery to a user's mobile device.

At step 135, the advertisement is transmitted from the mobile advertising suite 130 to a mobile device of a consumer 140. The consumer 140's mobile device has a display that is capable of displaying advertising content. By viewing the advertisement, the consumer 140 gains value by receiving information relevant to the consumer 140. In certain embodiments, the information could comprise offers for discounts or free products or services. As a response to the advertisement, the consumer may choose to buy the advertised product or service from her mobile device, as seen in step 145.

FIG. 2A illustrates a social contacts network in a wireless communication network according to one embodiment of the present disclosure. Social contacts network 200 comprises a mobile device user 210. The user 210 is connected to a plurality of contacts 220 that also comprise part of social contacts network 200. In various embodiments, the connections between the user 210 and the contacts 220 could represent any type of communicative connection, such as email contacts, address book entries, telephone contacts, etc. Social contacts network 200 may include as few or as many contacts as desired by user 210. Social contacts network 200 can be dynamic. As new contacts are made, and old contacts are modified or removed, the social contacts network 200 changes to match the changes in the contacts 220. In the embodiment shown in FIG. 2A, each contact 220 is connected only to user 210. It is understood, however, that each contact 220 could also be connected to other contacts 220.

FIG. 2B shows an exemplary display of a contact list 230 on a user's mobile device, according to certain embodiments of the present disclosure. The names in contact list 230 comprise part of a user's social contact network 200, as seen in FIG. 2A.

Figure 3:
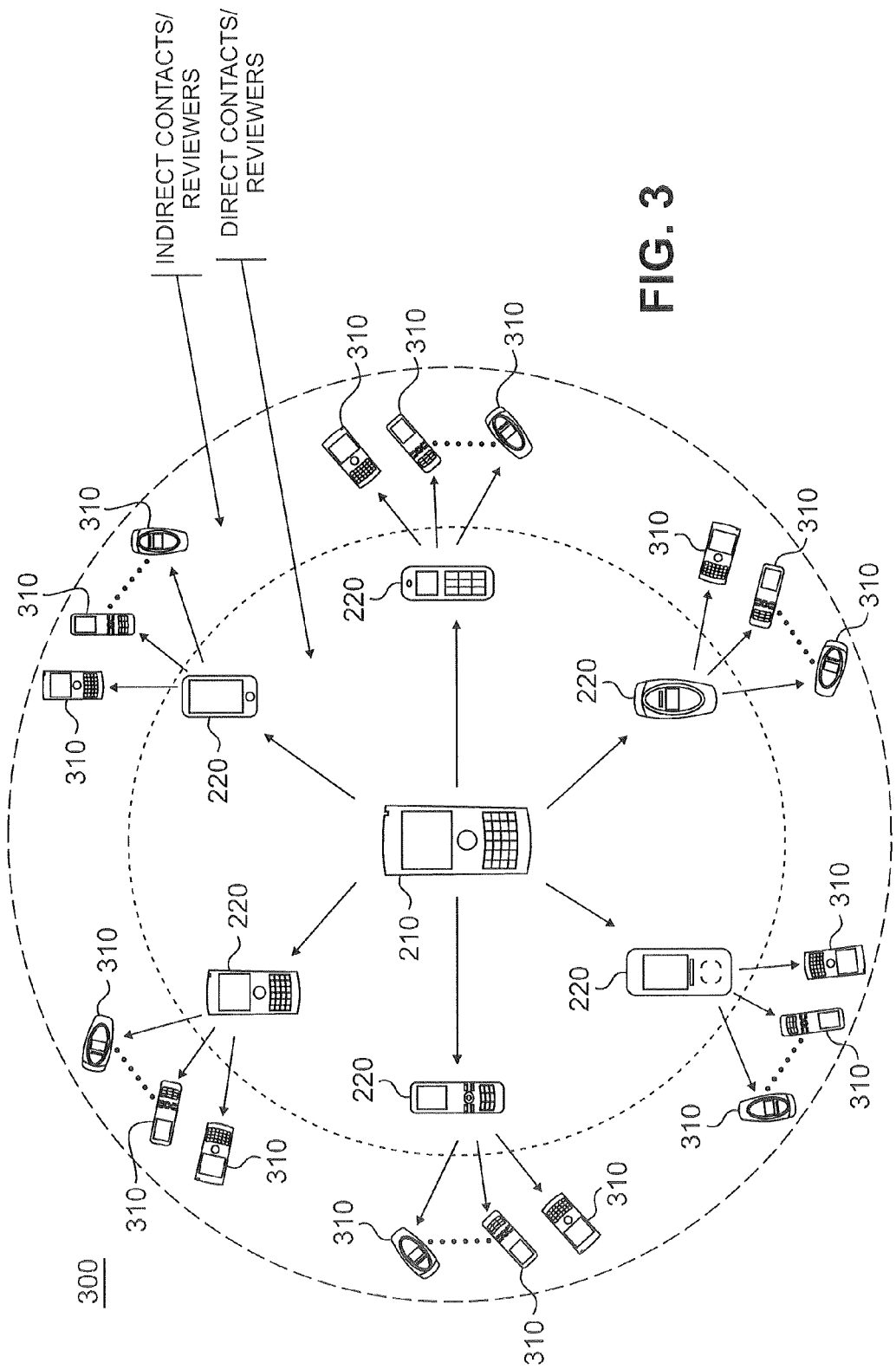
FIG. 3 illustrates an expanded social contacts network in a wireless communication network according to one embodiment of the present disclosure.

FIG. 3 illustrates an expanded social contacts network in a wireless communication network according to one embodiment of the present disclosure. Like the social contacts network 200 of FIG. 2A, the expanded social contacts network 300 comprises user 210 and a plurality of contacts 220. Because the contacts 220 are directly connected to user 210, they are referred to as direct contacts. Each direct contact 220 is connected to a plurality of contacts 310. With respect to user 210, these contacts 310 are called indirect contacts. Each indirect contact 310 is not directly connected to user 210, but is directly connected to a direct contact 220. Therefore, each indirect contact 310 is indirectly connected to user 210. In the embodiment shown in FIG. 3, each indirect contact 310 is connected to only one direct contact 220. It is understood, however, that each indirect contact 310 could be directly connected to more than one direct contact 220. Each indirect contact 310 could also be directly connected to other indirect contacts 310.

In certain embodiments of the present disclosure, user 210 may view an advertisement displayed on his mobile device. When the same advertisement has been viewed and rated by a direct contact 220 or an indirect contact 310 within the social contacts network 300, the reviewing direct contact 220 or indirect contact 310 is called a reviewer. A direct reviewer is a direct contact 220 that has reviewed an advertisement for user 210. An indirect reviewer is an indirect contact 310 that has reviewed an advertisement for user 210. The process of reviewing an advertisement for a contact can work in the opposite direction also. In other words, user 210 can serve as a reviewer of advertisements for direct contacts 220.

Figure 4:
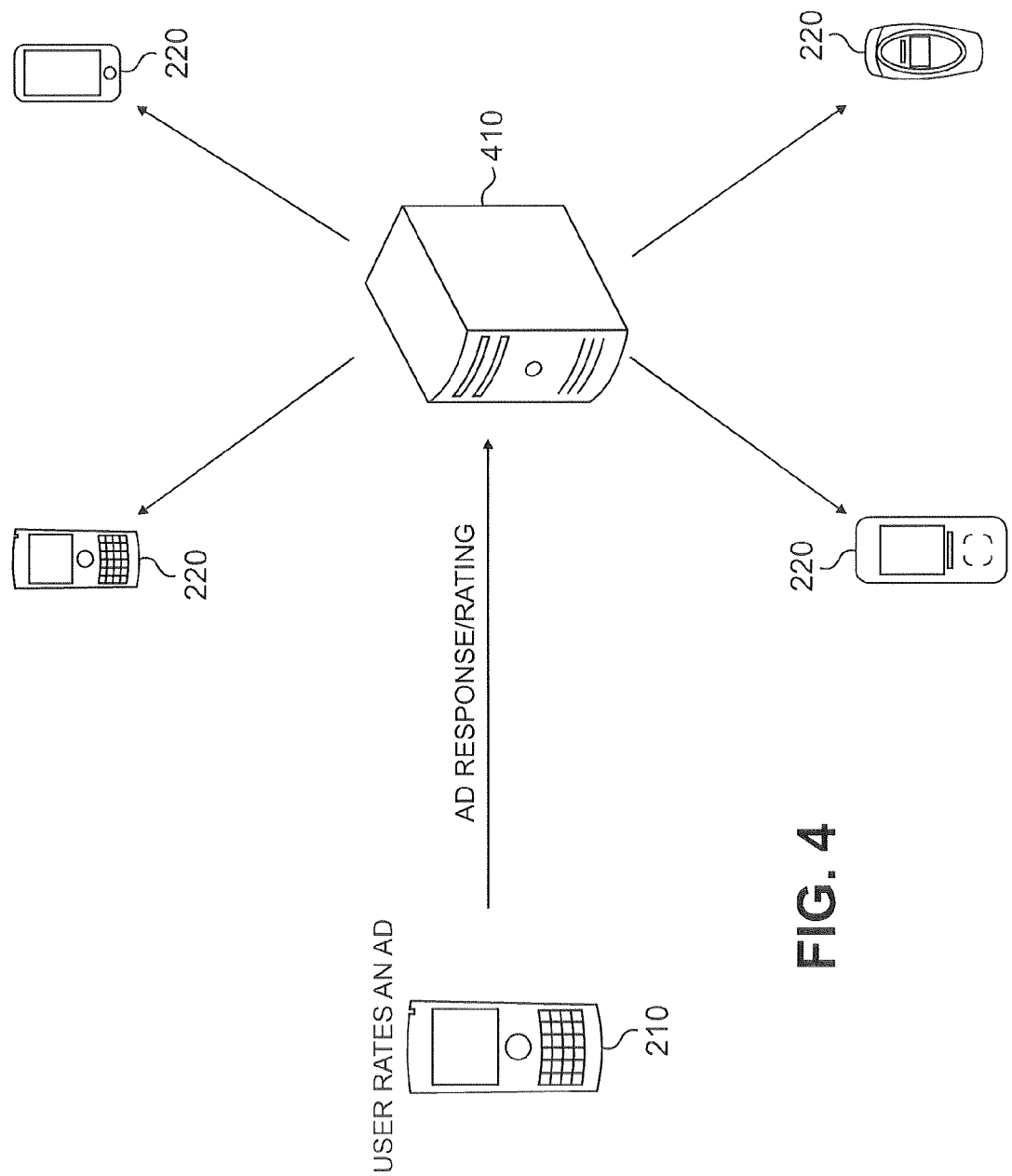
FIG. 4 illustrates peer rating dissemination according to one embodiment of the present disclosure.

FIG. 4 illustrates peer rating dissemination according to one embodiment of the present disclosure. In certain embodiments, a mobile device user, such as user 210, views an advertisement on his mobile device. After viewing the advertisement, user 210 is given an opportunity to rate the advertisement. If user 210 chooses to rate the advertisement, he enters the rating on his mobile device. User 210's response to the advertisement is transmitted to Ad Server 410. Ad Server 410 receives the rating from user 210, then disseminates the rating of the advertisement to one or more mobile users, such as direct contacts 220. The process of receiving and disseminating ratings of advertisements is described in greater detail below.

Figure 5:
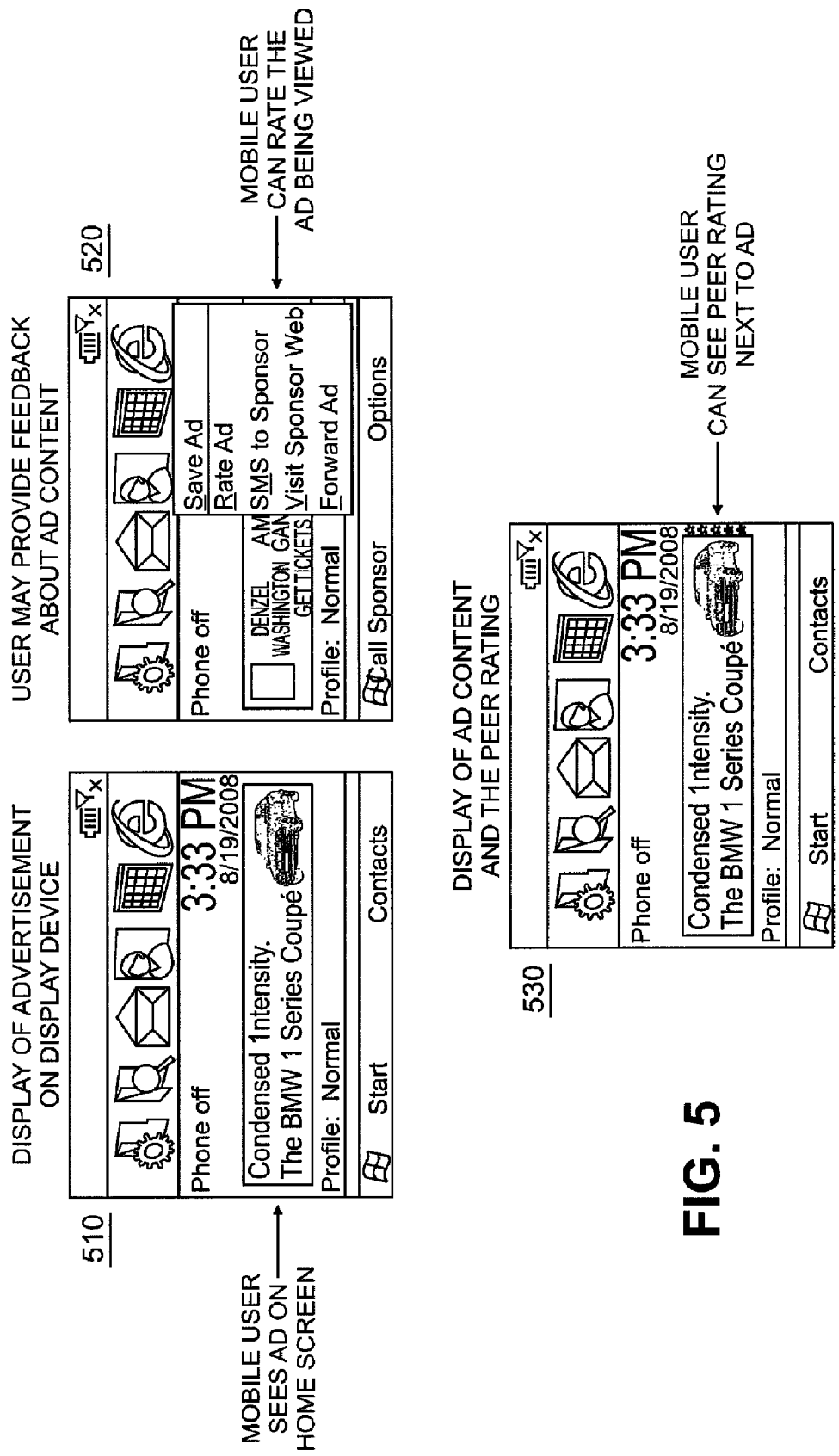
FIG. 5 illustrates a process for ad display and response on a mobile device according to one embodiment of the present disclosure.

FIG. 5 illustrates a process for ad display and response on a mobile device according to one embodiment of the present disclosure. Views 510-530 depict various exemplary screen images of a mobile device in accordance with certain embodiments. In view 510, an advertisement is displayed on the screen of the mobile device. For example, the advertisement may be displayed on the home screen of the mobile device. The user of the mobile device, such as user 210, may choose to view the advertisement on the mobile device. During or following the presentation of the advertisement, user 210 may choose to provide a rating or other feedback about the advertisement, as shown in view 520. In certain embodiments, user 210 may access the rating process by choosing an option from a drop-down or pop-up menu, as shown in view 520. Once user 210 has rated the advertisement, the rating feedback is transmitted to an ad server, such as Ad Server 410.

In view 530, the same advertisement is displayed with a peer rating. The peer rating indicates how other viewers have rated the advertisement. For example, in certain embodiments, view 530 could depict the screen of a mobile device of a direct contact 220 following the rating of the advertisement by user 210, as described in view 520. The peer rating that direct contact 220 sees reflects the rating given to the advertisement by user 210. In other embodiments, view 530 could represent a variation of view 510 where the advertisement has already been rated by one or more peers before it is displayed on user 210's mobile device.

In the example shown in view 530, the rating is depicted as one or more stars. It is understood, however, that other graphical symbols may be used, such as circles, asterisks, etc. In other embodiments, different rating systems may be depicted, including integer or decimal numbers, gauge-like images showing a bar of variable length, images of a thumb turned up/down/sideways, etc.

Figure 6:
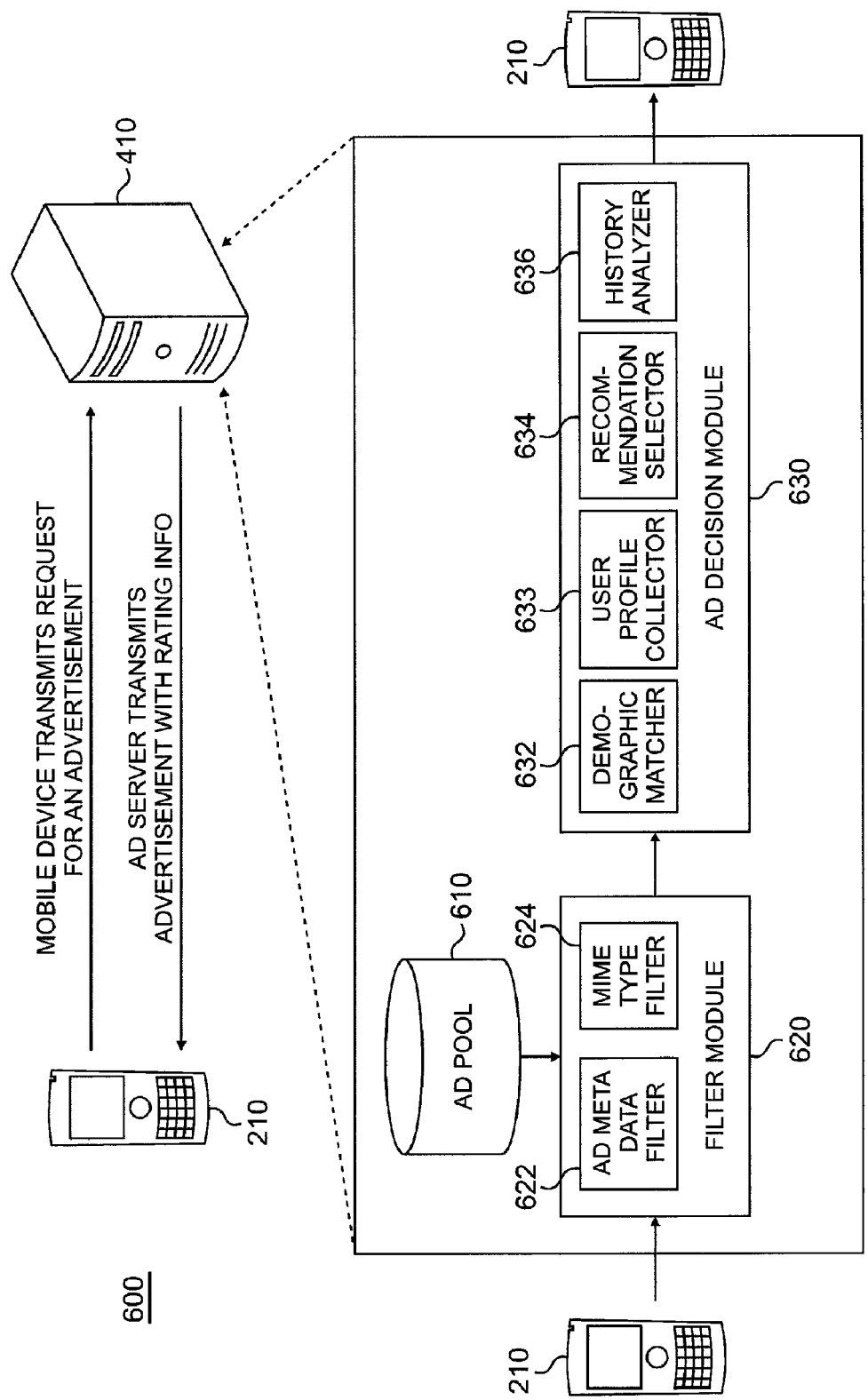
FIG. 6 illustrates a system and method for displaying advertisements on a mobile device according to one embodiment of the present disclosure.

FIG. 6 illustrates a system and method for displaying advertisements on a mobile device according to one embodiment of the present disclosure. System 600 includes an Ad Server 410. The Ad Server 410 comprises database 610, filter module 620 and ad decision module 630. Information for each advertisement is provided to Ad Server 410 by an advertising agency or distributor, such as advertising distributor 120, as part of an advertising campaign. The ad information is stored electronically in an ad pool in database 610. The ad information in the ad pool includes meta data associated with each advertisement, including, but not limited to, the category/genre that the ad belongs to, expiration date, action related information, display restrictions, and any other data which are required for logistical purposes. Every advertisement also has an associated ranking value when it is first deployed for distribution.

When a user, such as user 210, makes a request to Ad Server 410 for a particular genre of ad by a display device, the Ad Server 410 processes the request through filter module 620. Filter module 620 includes a meta data filter 622 and a MIME type filter 624. Meta data filter 622 filters the collection of advertisements from the ad pool by matching the meta data (e.g., genre) of each advertisement in the ad pool with the request from user 210. MIME type filter 624 further refines the selection of the advertisement by comparing the MIME type display capabilities of user 210's mobile device with the display requirements of each advertisement.

Next, Ad Server 410 processes the request from user 210 through ad decision module 630. Ad decision module 630 includes a demographic matcher 632, a user profile collector 633, a recommendation selector 634, and a history analyzer 636. Demographic matcher 632 matches the demographic target of each advertisement with the request from user 210. User profile collector 633 collects demographic data and user interest information from user 210. The demographic data includes information such as gender, age, etc of an end user. User interest information includes any information that describes an end user's interest, or lack thereof, in various categories, particularly those related to advertising. For example, the user interest information might include information that user 210 likes certain types of automobile advertisements, but does not want to view certain other types of restaurant advertisements. In some embodiments, user profile collector 633 may be fully contained with demographic matcher 632. In other embodiments, user profile collector 633 may be a separate module from demographic matcher 632.

Recommendation selector 634 uses peer ratings of each advertisement to improve ad selection. Peer ratings are discussed in greater detail below. History analyzer 636 uses historical request and response information from user 210 to further refine the selection of the advertisement to be viewed. Once all factors influencing the selection of the advertisement are satisfied in both modules 620 and 630, an advertisement is selected and delivered to user 210's mobile device.

Attention is now turned to peer ratings. A user, such as user 210, who views the advertisement on his mobile device is called a viewer. When user 210 rates or provides feedback about an ad, he is called a reviewer. A direct reviewer is one who has a direct connection with the viewer. An indirect reviewer is one who has an indirect connection with the viewer, through other reviewers.

User 210's mobile device allows user 210 to provide feedback, such as a rating, on an advertisement. When user 210 responds with feedback on an ad, the rating/feedback information is transmitted back to Ad Server 410. User 210's mobile device can also display a peer rating of the displayed ad, whenever the peer rating is available from Ad Server 410. A peer rating represents an aggregation of ad ratings from one or more reviewers. In some embodiments, the peer rating might be a straight average, or mean, of all available ratings for the ad. In other embodiments, the peer rating might be a median or mode of available ratings. In still other embodiments, the calculation of the peer rating might be weighted to favor ratings from direct reviewers over ratings from other reviewers. The availability of each reviewer's rating on the ad is controlled by each reviewer. Reviewers can set their rating/feedback to one of several levels of visibility, including: private (visible to no one), friends (direct connections), friends of friends (indirect connection), or public (everyone).

The rating/feedback of each reviewer is stored on Ad Server 410 for use by recommendation selector 634. The reviewer rating/feedback is used to adjust the ranking value for each ad on Ad Server 410. The adjusted ranking value is called a Socio Ad Rank. When a user makes a request to view an ad from Ad Server 410, the Socio Ad Rank is used to calculate an ad/user specific Socio Ad Rank which is based on ratings from direct reviewers. Recommendation selector 634 uses this global Socio Ad Rank and ad/user specific Socio Ad Rank to help Ad Decision Module 630 select the ad for delivery upon a user request.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, an ad server configured to transmit advertising content to a first mobile device, the ad server comprising:
   a filter module configured to filter a plurality of advertisements based on meta data for each advertisement;
   an ad decision module configured to further filter the plurality of advertisements based on an end user profile and ratings from a plurality of contacts on a contacts list of the first mobile device; and
   an electronic storage medium for storing information about the plurality of advertisements.

2. The ad server as set forth in claim 1, wherein the ad server is further configured to:
   receive the plurality of advertisements from an advertising distributor;
   receive ratings from a plurality of mobile devices; and
   transmit a selected advertisement to the first mobile device.

3. The ad server as set forth in claim 1, wherein the filter module comprises:
   an ad meta data filter configured to filter the plurality of advertisements by comparing meta data with an advertisement request from the first mobile device; and a MIME type filter configured to filter the plurality of advertisements by comparing MIME type display capabilities of the first mobile device with a display requirement of each of the plurality of advertisements.

4. The ad server as set forth in claim 1, wherein the ad decision module comprises:
a demographic matcher;
a user profile collector;
a recommendation selector; and
a history analyzer.

5. The ad server as set forth in claim 1, wherein the ad server is further configured to:
calculate a peer rating of a selected advertisement; and
transmit the peer rating of the selected advertisement to the first mobile device.

6. The ad server as set forth in claim 5, wherein the ad server is further configured to:
calculate the peer rating of the selected advertisement using a rating from a contact on the contacts list of the first mobile device.

7. The ad server as set forth in claim 5, wherein the ad server is further configured to:
calculate the peer rating of the selected advertisement using a rating from an indirect contact of the first mobile device, wherein the indirect contact is a contact on a contacts list of a contact on the contacts list of the first mobile device.

8. A wireless communication network comprising:
a plurality of ad servers, each ad server configured to transmit advertising content to a first mobile device, each ad server comprising:
a filter module configured to filter a plurality of advertisements based on meta data for each advertisement;
an ad decision module configured to further filter the plurality of advertisements based on an end user profile and ratings from a plurality of contacts on a contacts list of the first mobile device; and
an electronic storage medium configured to store information about the plurality of advertisements.

9. The wireless communication network as set forth in claim 8, wherein each ad server is further configured to:
receive the plurality of advertisements from an advertising distributor;
receive ratings from a plurality of mobile devices; and
transmit a selected advertisement to the first mobile device.

10. The wireless communication network as set forth in claim 8, wherein each filter module comprises:
an ad meta data filter configured to filter the plurality of advertisements by comparing meta data with an advertisement request from the first mobile device; and
a MIME type filter configured to filter the plurality of advertisements by comparing MIME type display capabilities of the first mobile device with a display requirement of each of the plurality of advertisements.

11. The wireless communication network as set forth in claim 8, wherein each ad decision module comprises:
a demographic matcher;
a user profile collector;
a recommendation selector; and
a history analyzer.

12. The wireless communication network as set forth in claim 8, wherein each ad server is further configured to:
calculate a peer rating of a selected advertisement; and
transmit the peer rating of the selected advertisement to the first mobile device.

13. The wireless communication network as set forth in claim 12, wherein each ad server is further configured to:
calculate the peer rating of the selected advertisement using a rating from a contact on the contacts list of the first mobile device.

14. The wireless communication network as set forth in claim 12, wherein each ad server is further configured to calculate the peer rating of the selected advertisement using a rating from an indirect contact of the first mobile device, wherein the indirect contact is a contact on a contacts list of a contact on the contacts list of the first mobile device.

15. For use in a wireless communication network, a method of targeting advertising for a first mobile device, the method comprising:
receiving a plurality of advertisements from an advertising distributor;
filtering the plurality of advertisements based on meta data for each advertisement;
receiving end user ratings of the plurality of advertisements from a plurality of mobile devices;
further filtering, using an ad server, the plurality of advertisements based on an end user profile and the end user ratings from a plurality of contacts on a contacts list of the first mobile device; and
transmitting a selected advertisement to the first mobile device.

16. The method as set forth in claim 15 further comprising receiving a rating for the selected advertisement from the first mobile device.

17. The method as set forth in claim 15 further comprising:
matching a demographic target of the plurality of advertisements with a user of the first mobile device; and
using historical ad response information from the user of the first mobile device to determine the selected advertisement.

18. The method as set forth in claim 15 further comprising:
calculating a peer rating of the selected advertisement; and
transmitting the peer rating of the selected advertisement to the first mobile device.

19. The method as set forth in claim 18, wherein calculating the peer rating of the selected advertisement further comprises:
calculating the peer rating of the selected advertisement using a rating from a contact on the contacts list of the first mobile device.

20. The method as set forth in claim 18, wherein calculating the peer rating of the selected advertisement further comprises:
calculating the peer rating of the selected advertisement using a rating from an indirect contact of the first mobile device, wherein the indirect contact is a contact on a contacts list of a contact on the contacts list of the first mobile device.

* * * * *